United States Patent [19]

Tsukamoto

[11] Patent Number: 4,758,474
[45] Date of Patent: Jul. 19, 1988

[54] MAGNETIC RECORDING MEMBER

[75] Inventor: Yuji Tsukamoto, Tokyo, Japan

[73] Assignee: Nec Corporation, Japan

[21] Appl. No.: 933,081

[22] Filed: Nov. 20, 1986

[30] Foreign Application Priority Data

Nov. 20, 1985 [JP] Japan ................................. 60-261773
Dec. 5, 1985 [JP] Japan ................................. 60-274546

[51] Int. Cl.⁴ ............................................. G11B 5/62
[52] U.S. Cl. .................................. 428/422; 428/469;
428/472; 428/629; 428/632; 428/694; 428/695;
428/701; 428/702; 428/900; 428/928
[58] Field of Search ............... 428/469, 422, 472, 611,
428/629, 632, 701, 702, 694, 695, 928

[56] References Cited

U.S. PATENT DOCUMENTS 4,124,736 11/1978 Patel et al. .......................... 428/622
4,224,381 9/1980 Patel et al. .......................... 428/652
4,307,156 12/1981 Yanagisawa ......................... 428/623
4,526,833 7/1985 Burguette et al. ................... 428/336
4,609,962 9/1986 Arai et al. ........................... 360/131
4,610,911 9/1986 Opfer et al. ......................... 428/213

*Primary Examiner*—George F. Lesmes
*Assistant Examiner*—William M. Atkinson
*Attorney, Agent, or Firm*—Laff, Whitesel, Conte & Saret

[57] ABSTRACT

Herein is disclosed a magnetic recording member having a high mechanical durability and an improved resistance to wear. The magnetic recording member comprises a substrate, a magnetic layer formed on the surface of the substrate and a first non-magnetic layer of a metal having a low melting point, preferably lower than 400° C. and formed on the magnetic layer, at least the surface of the first non-magnetic layer being oxidized. The magnetic recording member may further contain a lubricant layer.

The surface of the magnetic recording member of the invention presents a roughness lower than 25 nm and includes fine protrusions having a linear density higher than $1 \times 10^3$/mm.

The process for the preparation of the magnetic recording member is also disclosed.

13 Claims, 3 Drawing Sheets

MAGNETIC RECORDING MEMBER

BACKGROUND OF THE INVENTION

1. Field of the Invention

The present invention relates to a magnetic recording member preferably used in magnetic recording medium as, for example, magnetic discs, magnetic drums, magnetic tapes, and to the method for preparation thereof.

2. Description of the Prior Arts

Recently, magnetic tape, floppy disc and hard disc in which a magnetic metal film is used as a recording medium have been rapidly and widely developed as the magnetic recording member having a high recording density. It brings three great advantages to use the magnetic metal film as the recording medium. That is, first of all it is possible to reduce the thickness of the recording layer owing to its large saturated magnetic flux density. In the second place, because a high coercive force can be obtained, it is suitable for high density recording. Thirdly, the magnetic metal film can be easily prepared by means of a method such as plating, sputtering and vapor deposition etc.

The demand for high recording density in the magnetic recording apparatus has gradually increased in these years. In order to obtain such a high recording density, it is necessary to improve the properties of the magnetic recording member and those of the magnetic head, to reduce the thickness of the magnetic recording medium as well as to reduce the distance between the head and the recording member. The magnetic recording member such as magnetic tapes and floppy discs is, in general, used in contact with or quasi contact with a magnetic head to obtain the optimum recording density.

Further, in the hard disc, the magnetic head is used, being slightly levitated from the surface thereof. In order to reduce the distance between the surface of the hard disc and the magnetic head, the load exerted on the magnetic head is raised and also CSS (contact-start-stop) type head levitation system is adopted. Therefore, it sometimes causes friction or wear defects such as head crush on the surface of the magnetic recording layer.

As a solution for such problems, it has been proposed that a protective layer is applied onto the magnetic layer so that the mechanical durability is improved. It is required for such a protective layer to be excellent not only in mechanical durability such as wear resistance, but also in chemical durability (weathering resistance) such as corrosive resistance of the magnetic layer.

To date, there have been proposed various kinds of the protective layer and the method for preparation thereof as follows;

(1) A method wherein a high-hardness metal such as Rh, Cr is deposited onto the magnetic layer by the electroplating.

(2) A method wherein the surface of a magnetic layer is coated with high-hardness metal such as Cr, W or oxides such as $SiO_2$, $Al_2O_3$ (Japanese Patent Publication No. 185029/1983), carbides or nitrides of a high hardness (U.S. Pat. No. 4,277,540) by the sputtering or the vacuum deposition method, etc.

(3) A method wherein a protective oxide layer is formed by oxidizing the surface of a magnetic layer made of Co or Co-Ni in an oxidizing atmosphere, according to the heat-oxidizing (U.S. Pat. No. 4,124,736), the anodizing or the acid etching method.

The above methods of the prior art present problems as follows:

(1) The protective metal layer may be formed with a very low thickness and suitable for recording system of high density. Once the head crush occurs due to a contact with the magnetic head, however, fine metallic powder resulting from the head crush adheres to the magnetic head to further develop the crush with the result that it gives sometimes fatal damage to the recording medium. Moreover, due to its insufficient weathering resistance under a high relative moisture condition, the protective metal layer suffers from pit-like corrosion which causes readily the wear damage such as the head crush.

(2) Among the non-metallic protective layer such as oxide, nitride, carbide, etc., the protective layer of $SiO_2$ has been most widely used, because it is excellent in weathering resistance and wear resistance. Since $SiO_2$ presents a high absorption activity, however, fluids such as the lubricant, its solvent or the moisture in the air tend to spread between the magnetic head and the protective layer of $SiO_2$, when the rotation of the recording member is stopped. Thus, the so-called "head stick" phenomenon readily arises since the absorptive strength increases due to the surface tension of the fluid.

(3) In the heat-oxidizing method where the metallic surface of the magnetic layer is oxidized to form a protective oxide film on the surface of the magnetic layer, the heating must be generally conducted up to 300° C., in order to avoid the thermal deformation of the substrate and the degradation of the magnetic layer. At such a relatively low temperature, it is difficult to form a uniform oxide layer with a metal of a high melting point such as Co or Ni. Moreover, since the heat diffusion is insufficient in the treatment of such a low temperature, there remain, even after the treatment, micro defects such as pores and cracks and thermal stress in the magnetic layer. It has been pointed out that, due to the above defects, the magnetic recording member made by the heat-oxidizing method of the prior art does not have a uniform reproductivity and it readily suffers from the local corrosion of surface film-pores type.

There is another problem to be solved in the magnetic recording member with the lubricant layer. As explained in the above, the magnetic recording member of the type using magnetic metallic medium is sometimes coated with a lubricant for heightening the resistance to the wear due to the contact with the magnetic head and to the head crush.

For heightening the resistance to the head crush and to the wear, it is effective to planish the surface of the protective layer. When the planished protective layer is coated with the lubricant, however, the solvent and the surface-active agent contained in the lubricant tend to spread on the interface between the magnetic recording member and the magnetic head so that the absorptive strength increases due to the surface tension thereof, resulting in the following problems:

The so-called "head absorption phenomenon" arises. That is, the magnetic head is sticked by the absorptive stress due to the surface tension of the spreaded fluid. The second problem is the so-called "spin-off phenomenon" of the lubricant. That is, the lubricant tends to be dissipated by the centrifugal force due to the high-speed rotation of the magnetic recording member.

In order to solve the above problems, it has been proposed to mechanically process the surface of the magnetic disc to provide a surface roughness or irregularity (Japanese Patent Publication No. 150582 of 1984).

This method comprises planishing a substrate of a magnetic disc to provide a roughness of 5 nm on the surface thereof; and applying an elastically supported lapping film onto the surface of the substrate, while rotating the substrate. In this case, by controlling the size of the grinding grain on the lapping film and the contact pressure between the film and the substrate, the fine irregularity is formed concentrically on the substrate. The surface irregularity of the substrate may be transcribed successively to the magnetic layer, protective layer and so on, so that the final surface of the magnetic disc has also the fine irregularity.

This method of the prior art, however, is not efficient in the productivity, because the substrate is subjected to the lapping process one by one after it is planished to present a finely processed surface having a surface roughness of about 5 nm. Further the surface roughness obtained by lapping process is transcribed to that of the magnetic layer, so that the magnetic layer presents also surface irregularity with the result that the recording and reproducing characteristic and the SN ratio of the final recording member are lowered.

Although the magnetic disc should present a surface roughness higher than 5 nm in order to prevent the absorption phenomenon of the head and the "spin-off" phenomenon of the lubricant, it is required that the surface roughness of the magnetic disc should be restricted to lower than 10% of the levitation height of the magnetic head in order to obtain high and stable recording and reproducing characteristics and a high mechanical rigidity.

On the other hand, for obtaining the high recording density, it has been required recently that the levitation height of the magnetic head be lowered and that the vertical recording system be employed practically. In order to comply with such requirements, a new process for preparation of protective layer has been earnestly required to provide a magnetic recording member which presents a surface roughness for retaining the lubricant and a high wear resistance.

SUMMARY OF THE INVENTION

Accordingly, it is an object to resolve the above problems of the prior art and to provide a magnetic recording member preferably used in the high speed recording system.

It is another object to provide a magnetic recording member which presents an improved wear resistance and weathering resistance.

More particularly, the object of the present invention is to provide a magnetic recording member which has a high mechanical durability and with which the spinning-off of the lubricant and the stick of the head by absorption are effectively prevented.

It is still further object of the invention to provide a process for preparation of a magnetic recording member having an improved wear resistance and weathering resistance.

According to the present invention, there is provided a magnetic recording member comprising a substrate, a magnetic layer formed on the surface of the substrate and a first non-magnetic layer of a metal having a low melting point and formed on the magnetic layer, at least the surface of the first non-magnetic layer being oxidized.

The first non-magnetic layer may be partially oxided and thus it may be composed of a non-oxided portion and an oxided portion. Otherwise, the first non-magnetic layer may be substantially thoroughly oxidized.

According to a preferred embodiment of the present invention, the metal of the first non-magnetic layer has a melting point lower than 400° C. Such a metal of low melting point is, for example, Bi, In, Pb, Sn, alloys of these elements, Al alloy and Zn alloy.

According to another embodiment of the present invention, the magnetic recording member may further comprise a second non-magnetic layer between the magnetic layer and the first non-magnetic layer. The second non-magnetic layer may be composed of a metal such as Al, Bi, In, Pb, Sn, Zn, Ni, Cu, W, alloys thereof, and Ni-, Cu- and W-alloys containing B or P.

According to a still further preferred embodiment of the invention, the magnetic recording member comprises a lubricant layer such as a straight chain perfluoroalkyl polyether.

According to the present invention, there is also provided a process for preparing a magnetic recording member comprising the steps of:

forming a magnetic layer on a substrate;

forming a first non-magnetic layer having a low melting point on the surface of the magnetic layer;

heating the first non-magnetic layer in an oxidizing atmosphere to thereby oxidize at least the surface thereof, whereby the oxidized first non-magnetic layer presenting a surface with fine protrusions.

The above and other objects, features and advantages of the present invention will be apparent from the following description of preferred embodiments of the invention with reference to the accompanying drawings.

BRIEF DESCRIPTION OF THE ACCOMPANYING DRAWINGS

FIGS. 1 to 3 are respectively schematic sectional views of embodiments of the magnetic recording member according to the present invention.

DETAILED DESCRIPTION OF THE PREFERRED EMBODIMENTS

Figure 1:
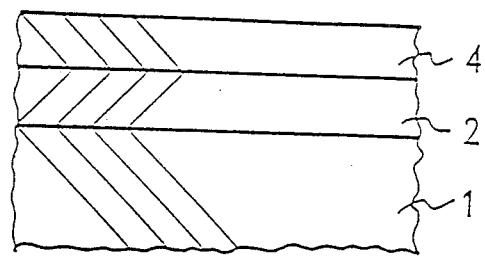

The basic conception of the present invention resides in using a metal of low melting point as the non-magnetic layer and oxidizing the same to form a protective oxide layer for the magnetic recording member.

As explained in the above, in the prior art, a metal such as Co, Ni, etc. is used. Although these metals have a high melting point, the oxidizing is conducted at temperatures lower than 300° C. In such a low temperature oxidizing process, the oxidizing of the metal such as Ni and Co proceeds at a logarithmical speed, so that the thickness of the oxidized layer is generally as low as 15 nm even after the oxidation of several hours at 300° C. Accordingly, it has been difficult to obtain a high wear resistance by such a method. Moreover, the heat diffusion is insufficient so that the release of the internal stress by atomic diffusion and the sealing of pores and cracks in the metal films are hardly attained.

Such defects, that is, the oxided layer is thin, pores remain after the oxidizing process and a high internal stress remains, degrade the weathering resistance of the final magnetic recording member.

Further the surface protrusions obtained by mechanical working of the above prior art present an accurate top angle like cones. Such accurate protrusions adversely affect the mechanical durability of the final magnetic recording member.

According to the present invention, however, the non-magnetic metal layer is composed of a metal of low melting point, preferably lower than 400° C., so that atomic diffusion occurs sufficiently in the course of the heat oxidizing process. Accordingly, even with the oxidizing process at temperatures lower than 300° C., the oxide layer grows in a sufficient large thickness and the micro defects such as pores and cracks are completely cured.

Owing to use of a metal haing a low melting point, oxided layer can be obtained with a sufficiently large thickness and the defects such as pores and cracks in the non-magnetic layer can be cured by the atomic diffusion.

Further, fine surface irregularity can be obtained by the heat oxidizing process. Because, in the course of the oxidizing process, the initial crystal grains grow and sometimes, melting of the metal and the decomposition or growth of the initial crystal grains and further the precipitation of secondary crystal grains are observed, so that protrusions of various forms and heights are formed on the surface of the oxide layer. Such micro surface protrusions are very effective in improving the weathering resistance and for retaining the lubricant at the high speed rotation of the magnetic recording member. Further the micro protrusions are formed uniformly over the surface of the oxide layer according to the present invention, while the micro protrusions obtained by the mechanical process are enevenly formed in the rarial direction of the surface.

The present invention will be explained by way of Examples, which are merely the illustrative examples of the present invention and should not be construed to restrict the scope of the invention.

EXAMPLE 1

FIG. 1 is a partial sectional view showing an example of the magnetic recording member according to the present invention.

As shown in FIG. 1, the magnetic disc comprises a substrate 1, a magnetic medium 2 and an oxide layer 4. This magnetic disc was prepared by the procedure as follows.

The surface of an aluminum alloy disc was mechanically processed to a smooth and flat surface. Then, the surface of the disc was plated with Ni-P alloy and then planished to a surface roughness of 5 nm to thereby provide a substrate 1. On the surface of the substrate 1 thus prepared, Co-Ni-P alloy was plated in the thickness of 50 nm to form a magnetic layer 2. Then, as a non-magnetic metal of a low melting point, Sn was deposited on the magnetic layer 2 in the thickness of 70 nm by the vacuum deposition. Thereafter, the resulting disc was burned at 230° C. for 2 hours in the air and to oxide the non-magnetic metal layer 3 of Sn to thereby form an oxide layer 4 thereof on the surface of the magnetic layer 2. The resulting magnetic disc is hereunder referred to as Sample 1.

EXAMPLE 2

Figure 2:
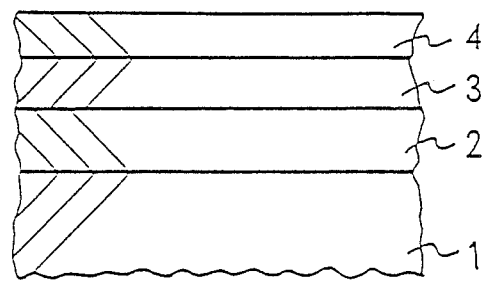

FIG. 2 is a partial sectional view of Sample 2.

As shown in FIG. 2, the magnetic disc of Sample 2 comprises a substrate 1, a magnetic layer 2, a non-magnetic metal layer 3 and an oxide layer 4. This magnetic disc was prepared as below.

The procedures of the example 1 were repeated except for burning the disc at 180° C. for 2 hours in the air. The oxide layer 4 had a thickness of 30 nm and a non-magnetic metal layer 3, i.e., the metallic tin remaining under the oxide layer 4. The resulting magnetic disc is hereunder referred to as Sample 2.

EXAMPLE 3

Figure 3:
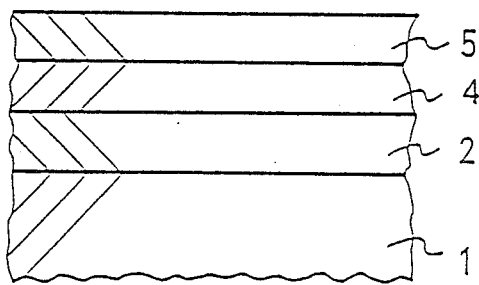

FIG. 3 is a partial sectional view of Sample 3.

As shown in FIG. 3, the magnetic disc of Sample 3 comprises a substrate 1, a magnetic medium 2, an oxide layer 4 and a lubricant layer 5. This magnetic disc was prepared as below.

The procedures of the example 1 were repeated except for applying straight chain perfluoroalkyl polyether onto the oxide layer 4 in the thickness of 5 nm to form the lubricant layer 5, which was conducted by the spin-coating. The resulting magnetic disc is hereunder referred to as Sample 3.

EXAMPLE 4

The procedures of the example 1 were repeated except that as the non-magnetic metal of a low melting point, Sn-20 wt%-Pb alloy was deposited on the magnetic layer 2 in a thickness of 60 nm by the vacuum deposition and the resulting disc was burned at 220° C. for 2 hours so that the tin alloy was completely transformed into the oxide layer 4 thereof. The resulting magnetic disc is hereunder referred to as Sample 4.

EXAMPLE 5

On the magnetic medium 2 of the magnetic disc prepared in the example 1, as a non-magnetic layer 3, Cu was plated in the thickness of 50 nm by the electroless plating, and Sn was plated on the non-magnetic layer 3 in the thickness of 40 nm by the electroless plating. Thereafter, the resulting disc was burned at 230° C. for 2 hours in the air to form the oxide layer 4 in the thickness of 50 nm. The resulting magnetic disc is hereunder referred to as Sample 5.

EXAMPLE 6

A magnetic disc was prepared by repeating the procedures conducted in the example 5, except that as the non-magnetic metal layer 3, Ni-P alloy was plated on the magnetic medium 2 in the thickness of 60 nm by the electroless plating, and Sn-10%-Bi alloy was plated on the non-magnetic layer 3 in the thickness of 40 nm by the sputtering. Thereafter, the resulting disc was burned at 200° C. for 2 hours in the air to form the oxide layer 4 in the thickness of 50 nm. The resulting magnetic disc is hereunder referred to as Sample 6.

EXAMPLE 7

Ni-Co-P alloy was plated in the thickness of 50 nm by the electroless plating and Sn-5% Al alloy was then plated on the magnetic layer on the substrate 1 of Example 1 to form the magnetic layer 2 in the thickness of 30 nm by the sputtering to form the non-magnetic layer 3. Thereafter, the resulting disc was burned at 200° C. for 3 hours in the air to form the oxide layer 4. The resulting magnetic disc is hereunder referred to as Sample 7.

EXAMPLE 8

A magnetic disc was prepared by repeating the procedures conducted in the example 7, except that as the first non-magnetic metal layer, Ni-Sn-P alloy was plated on the magnetic layer 2 in the thickness of 50 nm by the electroless plating, and as the second non-magnetic metal layer, Pb-30% Sn alloy was plated on the first non-magnetic metal layer in the thickness of 45 nm. Thereafter, the resulting disc was burned at 250° C. for 2 hours in the air to form the oxide layer 4. The resulting magnetic disc is hereunder referred to as Sample 8.

EXAMPLE 9

(Comparative Example)

On the substrate 1 of the example 1, as the magnetic medium 2, Co-Ni-P was plated in the thickness of 60 nm, that is, 10 nm thickner than that of Sample 1. Then, the obtained disc was burned at 280° C. for 2 hours in the air to form the oxide layer of 10 nm thickness on the surface of the magnetic layer 2. The resulting magnetic disc is hereunder referred to as Sample 9.

Measurement of the Properties and Results

CSS (contact-start-stop) test and weathering resistance were conducted on Samples 1 to 9 as shown above.

In CSS test, a magnetic head provided with a slider made of Mn-Zn ferrite was used, and the load of the head was 6 g. The results of CSS test are shown in terms of (a) the number of CSS tests for causing the defect due to friction on the surface of the magnetic disc, (b) the number of CSS tests for generating the powder due to wear and (c) the presence of the head crush.

Further, the weathering resistance test was conducted under the conditions; at the temperature 85° C. and the relative humidity 90%. The weathering resistance of each magnetic disc was estimated in terms of the number of the corrosion pits generated on the surface of the magnetic disc disposed in the atmosphere of the above conditions.

The results obtained on the respective magnetic disc by CSS test are shown in Table 1. As seen from these results, the magnetic discs prepared by the present invention (Samples 1 to 8) are quite excellent in wear resistance and head crush resistance, as compared with the magnetic discs prepared by the method of the prior art.

TABLE 1

| Sample No. | (a) | (b) | (c) |
|---|---|---|---|
| Sample 1 | 30,000 | 70,000 | non crush |
| Sample 2 | 20,000 | 50,000 | crush after 100,000 times |
| Sample 3 | 100,000 | 120,000 | non crush |
| Sample 4 | 25,000 | 55,000 | crush after 100,000 times |
| Sample 5 | 30,000 | 75,000 | non crush |
| Sample 6 | 35,000 | 85,000 | non crush |
| Sample 7 | 30,000 | 60,000 | crush after 100,000 times |
| Sample 8 | 25,000 | 60,000 | non crush |
| Sample 9 | 6,000 | 10,000 | crush after 20,000 times |

Moreover, a magnetic disc with $SiO_2$-spin coated protective layer which was coated with the same lubricant layer as Sample 3 was prepared for comparison (Sample 10). The friction generated between the head and the disc at the starting time of the rotation of the magnetic disc device was measured. As a result of the measurement, it was found that as compared with said comparative Sample 10, the magnetic discs according to the present invention were much effective for preventing the absorption of the magnetic head, which occurs particularly when the magnetic disc is provided with the liquid lubricant layer, and that the load of the motor due to the increase of the starting torque for the magnetic disc device could be lowered by using the magnetic discs according to the present invention.

Table 2 shows the results of the weathering resistance test. As seen from the results, it is found that the magnetic discs according to the present invention has a quite excellent weathering resistance as compared with the magnetic disc of the prior art.

TABLE 2

| Sample | Number of corrosion pit generated/10 $mm^3$ |
|---|---|
| Sample 1 | 0 |
| Sample 2 | 0 to 1 |
| Sample 3 | 0 |
| Sample 4 | 2 to 3 |
| Sample 5 | 5 to 8 |
| Sample 6 | 0 |
| Sample 7 | 6 to 8 |
| Sample 8 | 2 to 3 |
| Sample 9 | 70 to 80 |

Table 3 shows the number of bit errors counted on each magnetic disc at the initialized state. It has been considered that the non-magnetic metal of a low melting point would be readily diffused into the magnetic medium to result in the increase of the number of bit errors and deteriorate the magnetic characteristics. However, as seen from Table 3, no deterioration was observed on the magnetic discs of the present invention, which presented considerably low error number.

TABLE 3

| Sample | Bit Error number |
|---|---|
| Sample 1 | 2 |
| Sample 2 | 3 |
| Sample 3 | 3 |
| Sample 4 | 7 |
| Sample 5 | 2 |
| Sample 6 | 5 |
| Sample 7 | 6 |
| Sample 8 | 3 |
| Sample 9 | 510 |

Specifically, the metal of a low melting point used in the present invention preferably includes at least one selected from the group consisting of Al, Bi, In, Pb, Sn and Zn and the alloys thereof. The non-magnetic metal layer may be composed of at least one selected from the group consisting of Al, Bi, In, Pb, Sn, Zn, Ni and Cu, W and their alloys. The non-magnetic metal may be Ni-, Cu-, S- or W-alloys containing B and/or P.

Examples of preferred embodiment II

A plate of Al alloy was worked by a lathe into a shape of a circular disc and heat treated to present small undulatons (amplitude: in the circumferential direction; less than 50 microns and in the radical direction; less than 10 microns). Then, Ni-P non-magnetic alloy was plated on the surface of the disc in the thickness of 50 microns, and ground and planished to obtain the surface roughness of lower than 5 nm. Co-Ni-P was plated on the surface of the Ni-P layer to form a magnetic layer of the thickness of 30 nm by the electroless plating, so that the surface roughness of the magnetic layer was also lower than 5 nm. The disc thus prepared including Co-Ni-P layer was used in each of the examples shown below.

Sample 11 is a magnetic disc prepared by depositing Sn in the thickness of 50 nm onto the above Co-Ni-P layer by RF magnetron sputtering, then charging the article directly into the furnace heated at 260° C. for an hour to oxidize. Sample 11 thus obtained presented the final surface roughness of 25 nm and the linear density of protrusions of $3.0 \times 10^3$/mm.

In Table 4, the conditions for preparation of Samples 12 to 22 were shown indicating the kinds of the deposited non-magnetic metal and the heat oxidizing conditions. In addition, Samples 19 to 22 were prepared by depositing Ni-P alloy as a non-magnetic metal (1) by the electroless plating, then depositing Si or Bi as a non-magnetic metal (2) by the RF magnetron sputtering.

TABLE 4-a

| Sample No. | Non-magnetic metal (1) | | |
|---|---|---|---|
| | Material | Method | thickness of the layer (nm) |
| 11 | Sn | RF[(1)] | 50 |
| 12 | Sn | RF | 50 |
| 13 | Sn | RF | 50 |
| 14 | Sn—30Pb | RF | 50 |
| 15 | Sn—30Pb | RF | 50 |
| 16 | Bi | RF | 40 |
| 17 | Bi—5 In | RF | 40 |
| 18 | Sn—5 In | RF | 40 |
| 19 | Ni—P | Plating[(2)] | 40 |
| 20 | Ni—P | Plating | 40 |
| 21 | Ni—P | Plating | 30 |
| 22 | Ni—P | Plating | 30 |

[(1)]RF: RF magnetron sputtering
[(2)]Plating: electroless plating

TABLE 4-b

| Sample No. | Non-magnetic metal (2) | | |
|---|---|---|---|
| | Material | Method | thickness of the layer (nm) |
| 11 | — | — | — |
| 12 | — | — | — |
| 13 | — | — | — |
| 14 | — | — | — |
| 15 | — | — | — |
| 16 | — | — | — |
| 17 | — | — | — |
| 18 | — | — | — |
| 19 | Sn | RF | 20 |
| 20 | Sn | RF | 20 |
| 21 | Bi | RF | 30 |
| 22 | Bi | RF | 30 |

TABLE 4-c

| Sample No. | heat oxidizing conditions | | | |
|---|---|---|---|---|
| | Atmosphere | Raising speed of temperature (°C./min) | temperature (°C.) | hour |
| 11 | air | directly[(3)] | 250 | 1 |
| 12 | air | 10 | 250 | 1 |
| 13 | air | 5 | 250 | 1 |
| 14 | air | 5 | 160 | 2 |
| 15 | Pure oxygen | 5 | 160 | 2 |
| 16 | air | directly | 250 | 1 |
| 17 | air | directly | 250 | 1 |
| 18 | air | — | 200 | 2 |
| 19 | air | directly | 280 | 2 |
| 20 | Pure oxygen | directly | 280 | 2 |
| 21 | air | 10 | 250 | 2 |
| 22 | air | 10 | 200 | 2 |

[(3)]directly: The case of charging the samples directly in the furnace heated at the indicated temperature. The other is the case of raising the temperature from the room temperature at the indicated speed.

Table 5 shows the surface roughness and the linear density of protrusions on the surface of the magnetic discs which have been subjected to the heat oxidizing step.

TABLE 5

| Sample No. | surface roughness $R_{max}$ (nm) | linear density of protrusions (/mm) |
|---|---|---|
| 11 | 25 | $3.0 \times 10^3$ |
| 12 | 15 | $5.5 \times 10^3$ |
| 13 | 10 | $7.5 \times 10^3$ |
| 14 | 25 | $4.5 \times 10^3$ |
| 15 | 15 | $6.0 \times 10^3$ |
| 16 | 20 | $3.0 \times 10^3$ |
| 17 | 25 | $2.0 \times 10^3$ |
| 18 | 10 | $7.5 \times 10^3$ |
| 19 | 20 | $5.0 \times 10^3$ |
| 20 | 15 | $2.5 \times 10^3$ |
| 21 | 15 | $4.0 \times 10^3$ |
| 22 | 10 | $4.5 \times 10^3$ |

As a comparative sample, there was prepared a magnetic disc by applying $SiO_2$ protective layer of 60 nm thickness onto said substrate by the spin coating process. The magnetic disc thus prepared is hereunder referred to as Sample 23.

Another comparative sample was prepared by lapping the surface of the Ni-P layer to obtain the surface roughness of 25 nm, then plating Co-Ni-P of 80 nm thickness as a magnetic layer by the electroless plating, further depositing $SiO_2$ of 60 nm thickness as a protective layer by the sputtering. The magnetic disc thus prepared had the surface roughness of 20 nm, and the linear density of $2.5 \times 10^3$ protrusions/mm. The resulting magnetic disc is hereunder referred to as Sample 24.

The surface of Sample 11 and Sample 24 were observed by means of a scanning electronic microscope and an apparatus for measuring the surface roughness. As a result, it was found that Sample 11 was excellent in uniform formation of protrusions on the surface. The top angles of the protrusions were obtuse and approximate to hemisphere.

Next, each of Samples 11 to 24 was coated with a liquid lubricant (straight chain perfluoroalkyl polyether) in the thickness of 30 nm by the spin coating. On the magnetic discs thus prepared, the absorption of the magnetic head and spinning off characteristics of the lubricant under a high speed rotation were determined.

The absorption of the head was determined by measuring the tangential stress (hereunder called static friction) exerted between the disc and the head at the starting time of the rotation of the magnetic disc. The static friction was measured under the conditions of; slider material; $Al_2O_3Tic$, vertical load; 10 g, temperature; 20° C., humidity; 80%. Table 6 shows the results of the static friction measurement effected on the Samples after 100 times and 30,000 times of CSS test.

TABLE 6

| Sample | static friction (g) | |
|---|---|---|
| | after 100 times of CSS test | after 30,000 times of CSS test |
| Sample 11 | 2.3 | 2.7 |
| Sample 12 | 2.0 | 2.6 |
| Sample 13 | 2.6 | 4.8 |
| Sample 14 | 2.5 | 3.0 |
| Sample 15 | 2.2 | 2.5 |
| Sample 16 | 2.4 | 2.8 |
| Sample 17 | 2.5 | 2.6 |
| Sample 18 | 3.4 | 4.2 |
| Sample 19 | 1.9 | 2.7 |
| Sample 20 | 2.3 | 2.8 |

TABLE 6-continued

| Sample | static friction (g) | |
|---|---|---|
| | after 100 times of CSS test | after 30,000 times of CSS test |
| Sample 21 | 2.9 | 4.0 |
| Sample 22 | 2.5 | 4.6 |
| Sample 23 | 6.0 | 8.7 |
| Sample 24 | 3.4 | 6.5 |

As seen from Table 6, Samples 11 to 22 according to the present invention generally exert a low static friction as compared with Samples 23 and 24. Moreover, change of the static friction exerted on Samples 11 to 22 was relatively small even after the number of the CSS tests. Since the magnetic disc of the present invention doesn't cause readily the absorption to the magnetic head, it is possible to reduce the motor load which is produced by the starting torque of the magnetic disc. Further, the magnetic disc of the present invention is also small in friction coefficient. Therefore defects due to the friction are reduced so that the reliability can be improved.

The spinning off of the lubricant was estimated by measuring the thickness of the lubricant layer after rotating the magnetic disc for 1,000 hours under the conditions of: rotation speed, 3,600 rpm, temperature; 35° C., humidity; 60%. Table 7 shows the results of the lubricant layer measurement.

TABLE 7

| Sample | thickness of lubricant layer (nm) |
|---|---|
| Sample 11 | 25 |
| Sample 12 | 22 |
| Sample 13 | 18 |
| Sample 14 | 22 |
| Sample 15 | 20 |
| Sample 16 | 21 |
| Sample 17 | 27 |
| Sample 18 | 22 |
| Sample 19 | 28 |
| Sample 20 | 21 |
| Sample 21 | 20 |
| Sample 22 | 19 |
| Sample 23 | 10 |
| Sample 24 | 20 |

The initial thickness of the lubricant applied on the magnetic disc was 30 nm. Therefore, the amount of the lubricant spinned off by the rotation was at most 40% in Sample 3, in the spinning off of the lubricant was prevented to the same extent as Sample 24.

Moreover, the magnetic disc of the present invention showed the S/N higher by 2 to 4 dB than Sample 24. This means that S/N can be improved by providing the surface irregularity of lower than 5 nm to the magnetic layer.

Specifically, although said non-magnetic metal such as Sn, Bi layer was prepared by the RF magnetron sputtering in this example, it may be conducted by other deposition, plating or salt bathing method.

Further, when the solid lubricant is applied on the magnetic disc, the effects can be obtained as well as in using the liquid lubricant.

The invention has thus been shown and described with reference to specific embodiments. However, it should be noted that the invention is in no way limited to the details of the illustrated structures but changes and modifications may be made within the scope of the appended claims.

I claim:

1. A magnetic recording member comprising a substrate, a magnetic layer formed on the surface of substrate and a first metal non-magnetic layer having a low melting point which is lower than 400° C. and which is formed on the magnetic layer, at least the surface of the first non-magnetic layer being oxidized.

2. A magnetic member as claimed in claim 1, wherein the magnetic layer is composed of Co-Ni-P.

3. A magnetic recording member as claimed in claim 1, wherein the first non-magnetic layer is composed of a non-oxidized portion and an oxided portion.

4. A magnetic recording member as claimed in claim 1, wherein the first non-magnetic layer is substantially thoroughly oxidized.

5. A magnetic recording member as claimed in claim 1, wherein the metal of the first non-magnetic layer is composed of at least one material selected from the group consisting of Bi, In, Pb, Sn, alloys of these elements, Al alloy and Zn alloy.

6. A magnetic member as claimed in claim 1, further comprising a second non-magnetic layer between the magnetic layer and the first non-magnetic layer.

7. A magnetic member as claimed in claim 6, wherein the second non-magnetic layer is composed of at least one selected from the group consisting of Al, Bi, In, Pb, Sn, Zn, Ni, Cu, W, alloys thereof, and Ni-, Cu- and W-alloys containing B or P.

8. A magnetic member as claimed in claim 1, further comprising a lubricant layer formed on the first non-magnetic layer.

9. A magnetic member as claimed in claim 8, wherein the lubricant layer is composed of a straight chain perfluoroalkyl polyether.

10. A magnetic member as claimed in claim 1, wherein the substrate is composed of an Al alloy.

11. A magnetic member as claimed in claim 10, wherein the substrate is composed of an Al alloy plated with Ni-P.

12. A magnetic member as claimed in claim 1, wherein the first non-magnetic layer presents a surface roughness lower than 25 nm.

13. A magnetic member as claimed in claim 13, wherein the surface of the first non-magnetic layer presents fine protrusions having a linear density higher than $1 \times 10^3$/mm.

* * * * *